United States Patent Office 3,267,594
Patented August 23, 1966

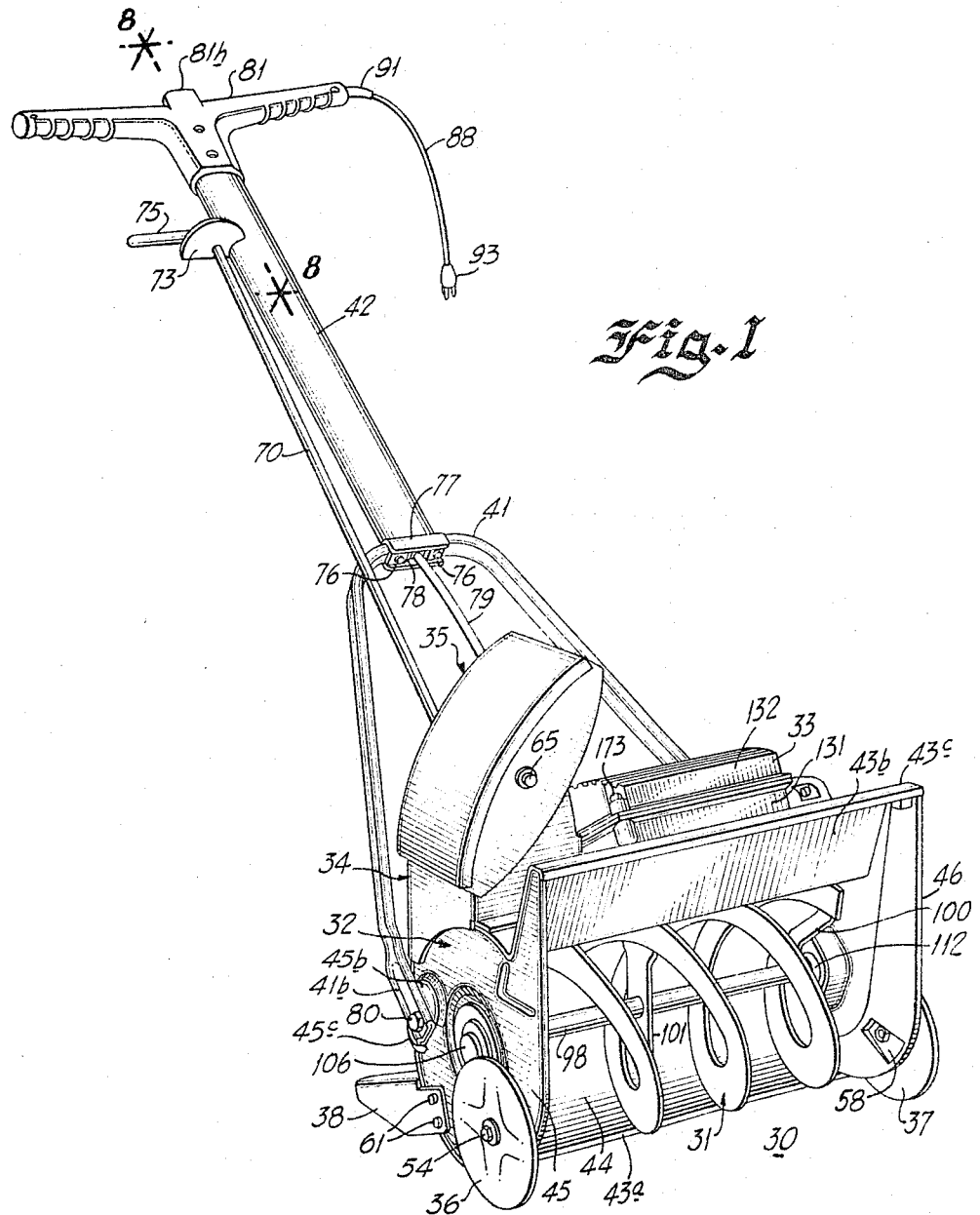

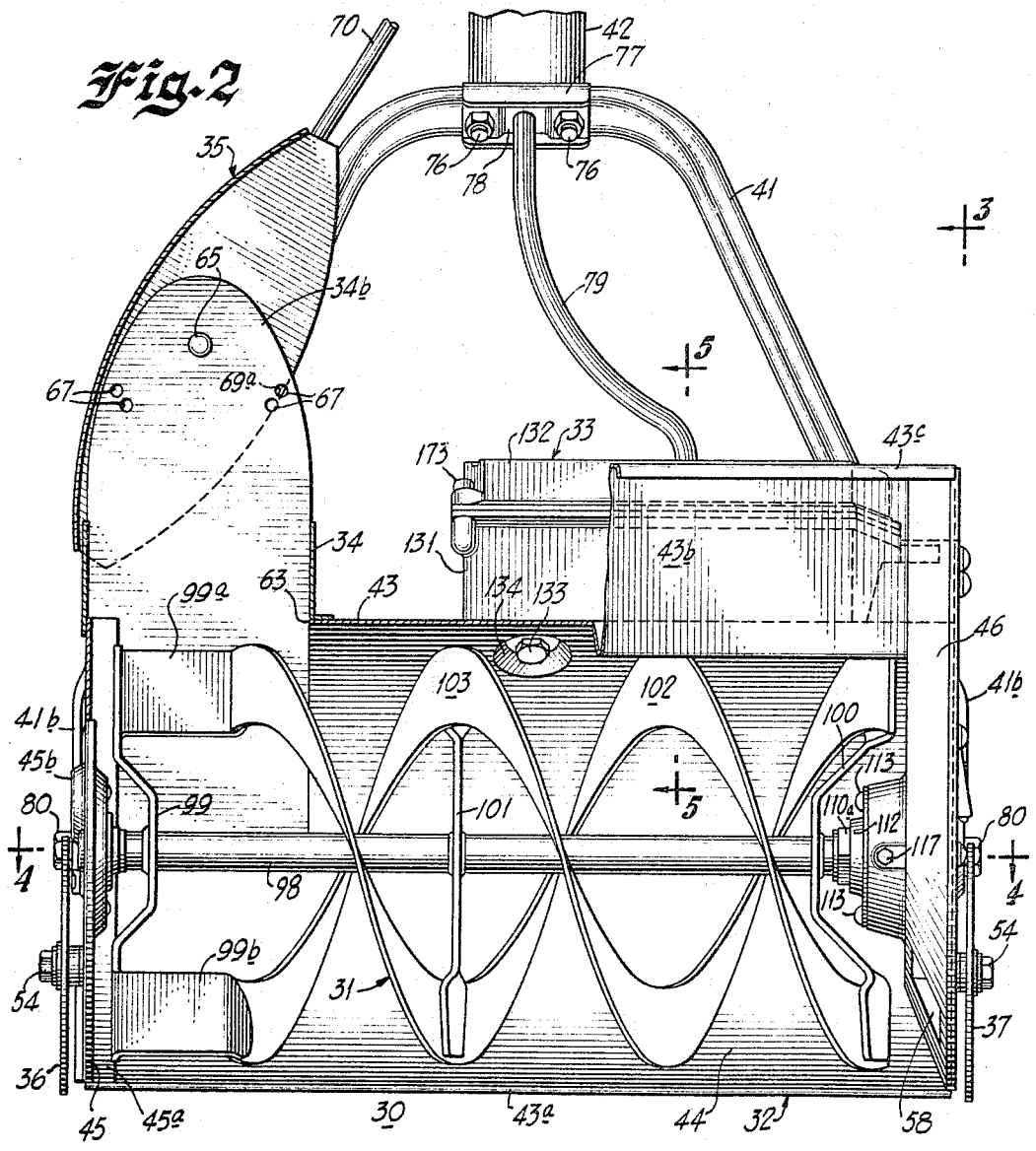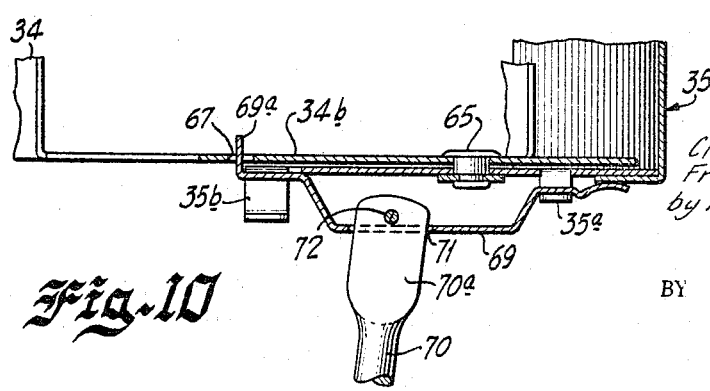

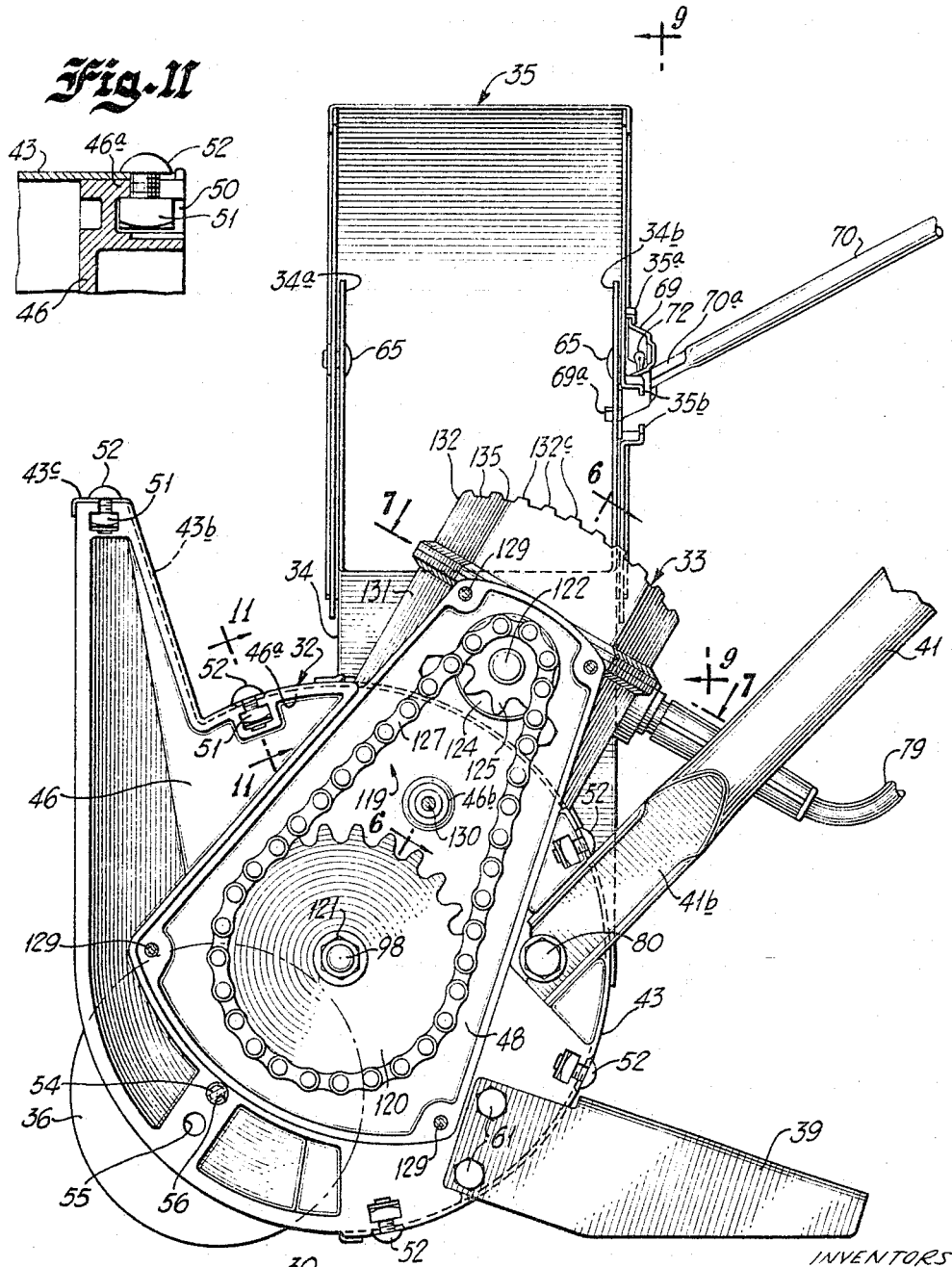

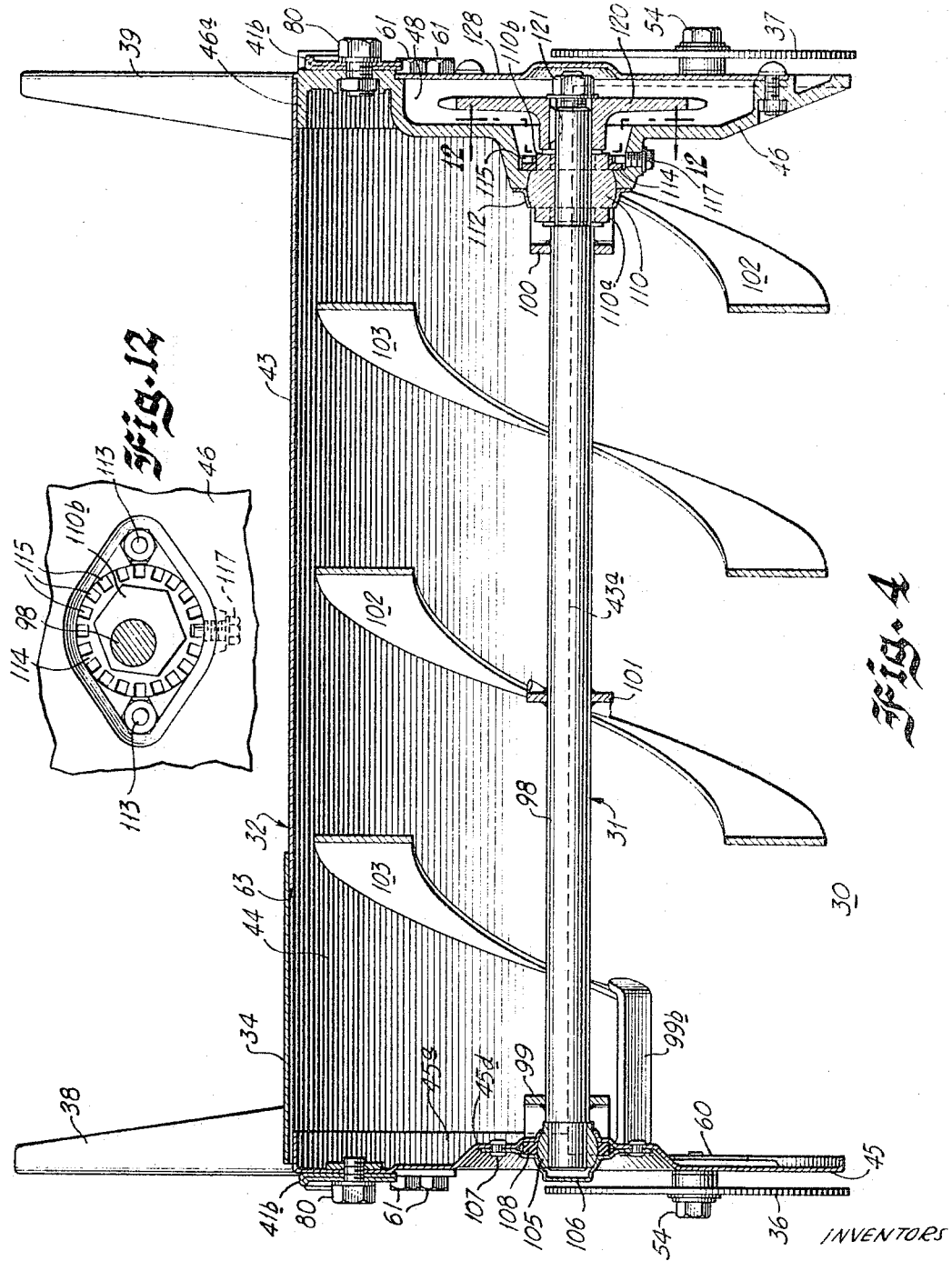

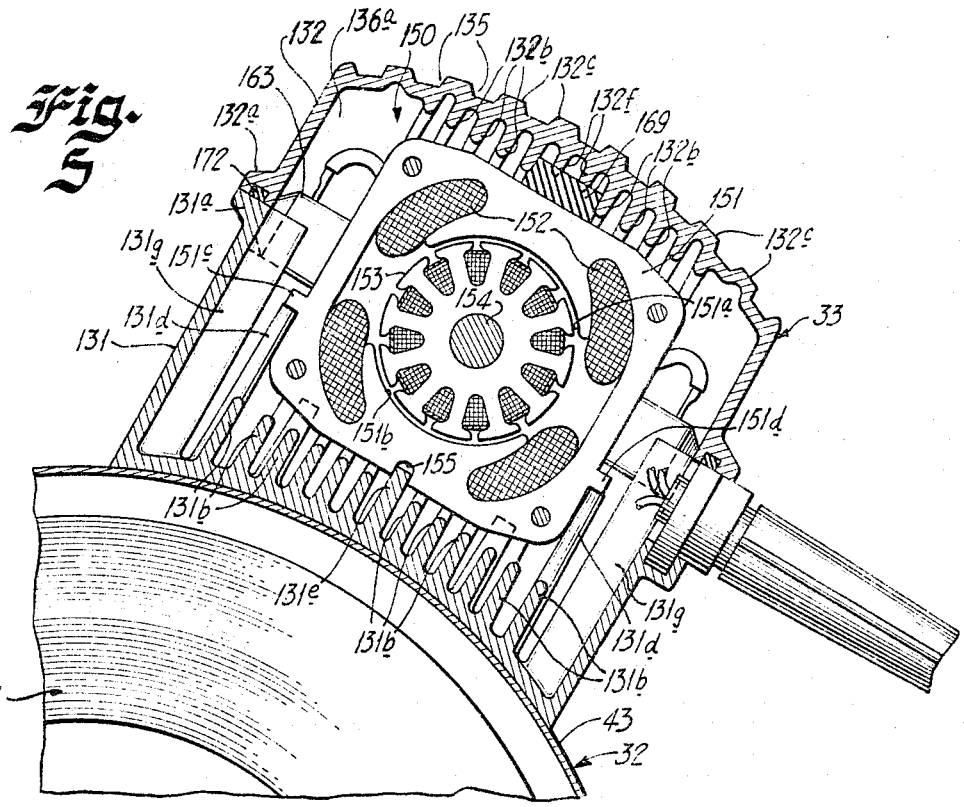
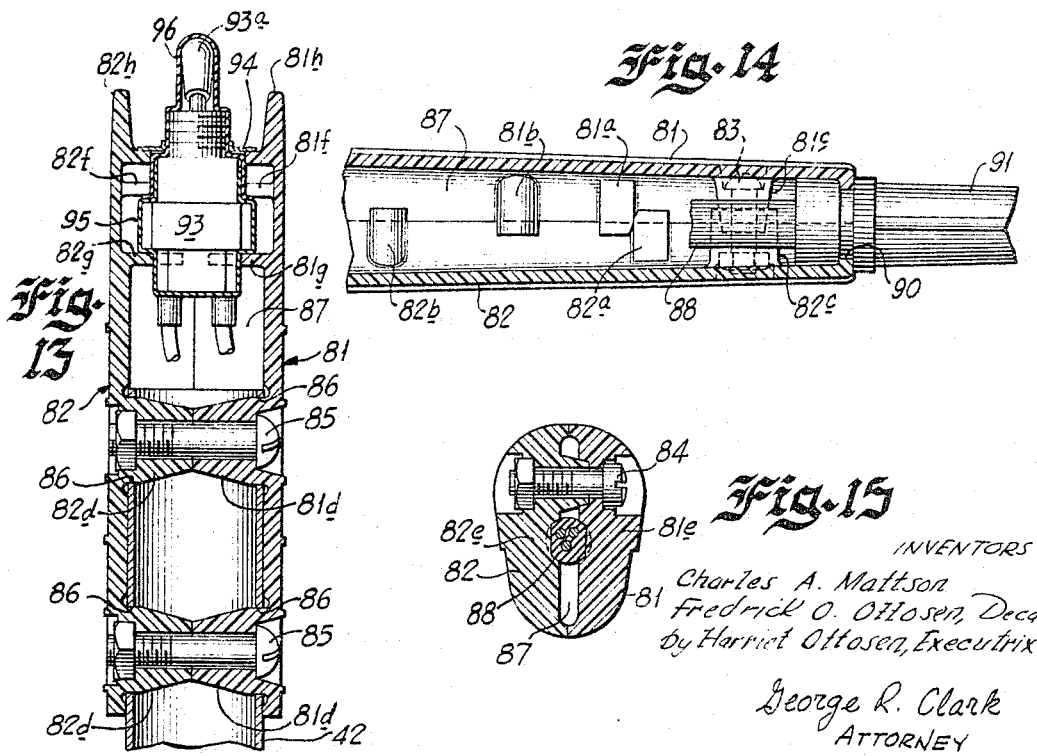

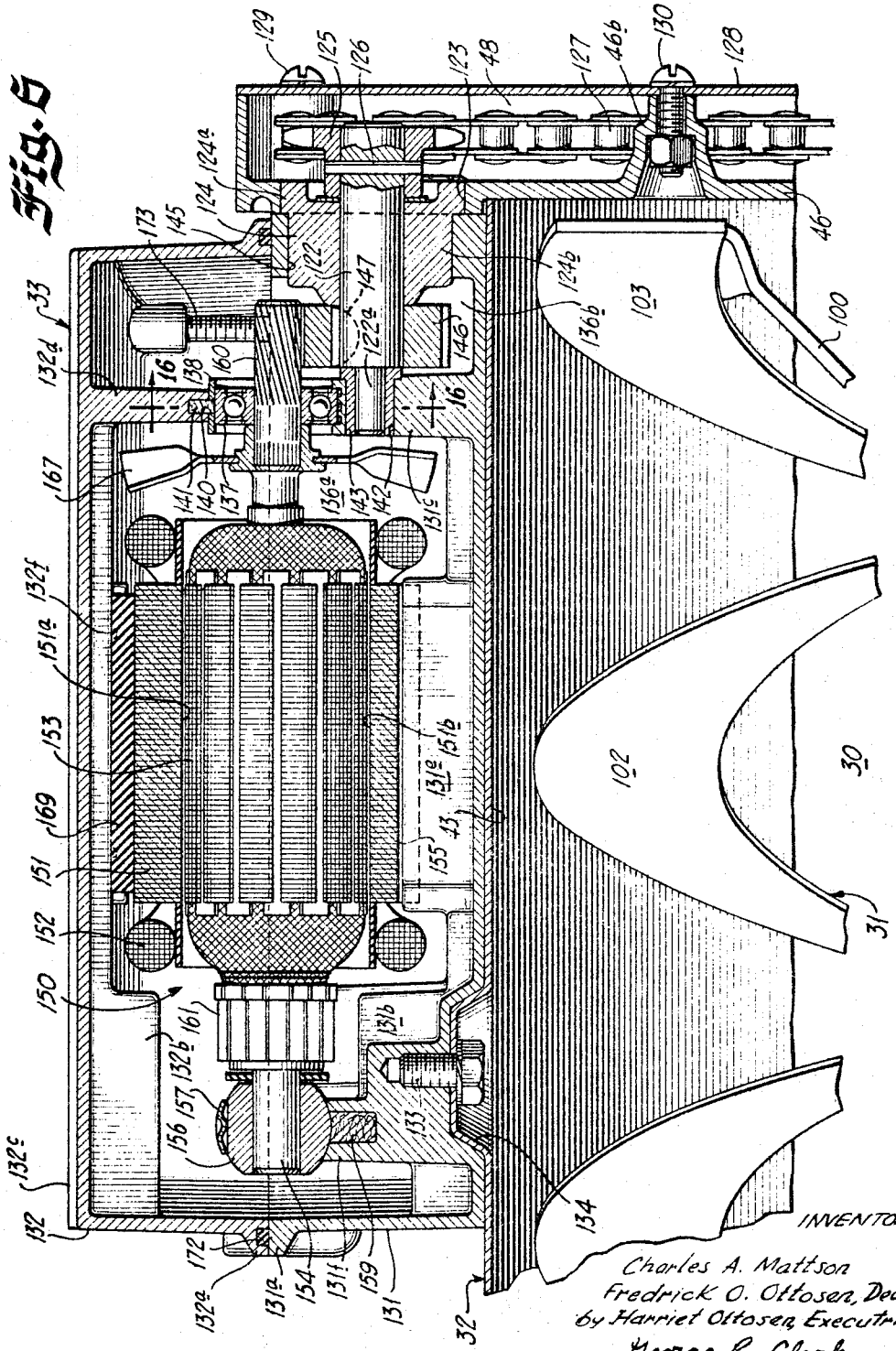

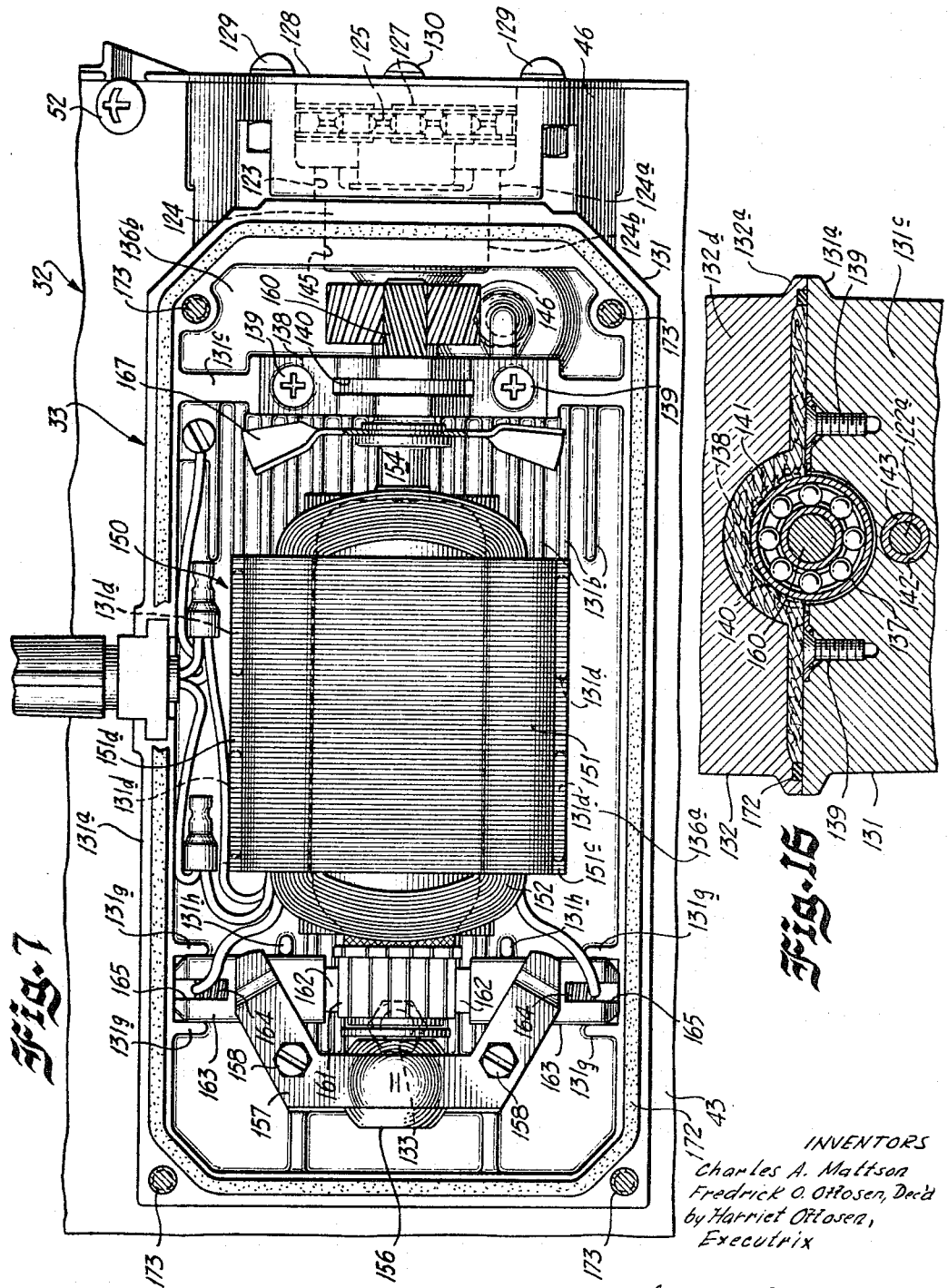

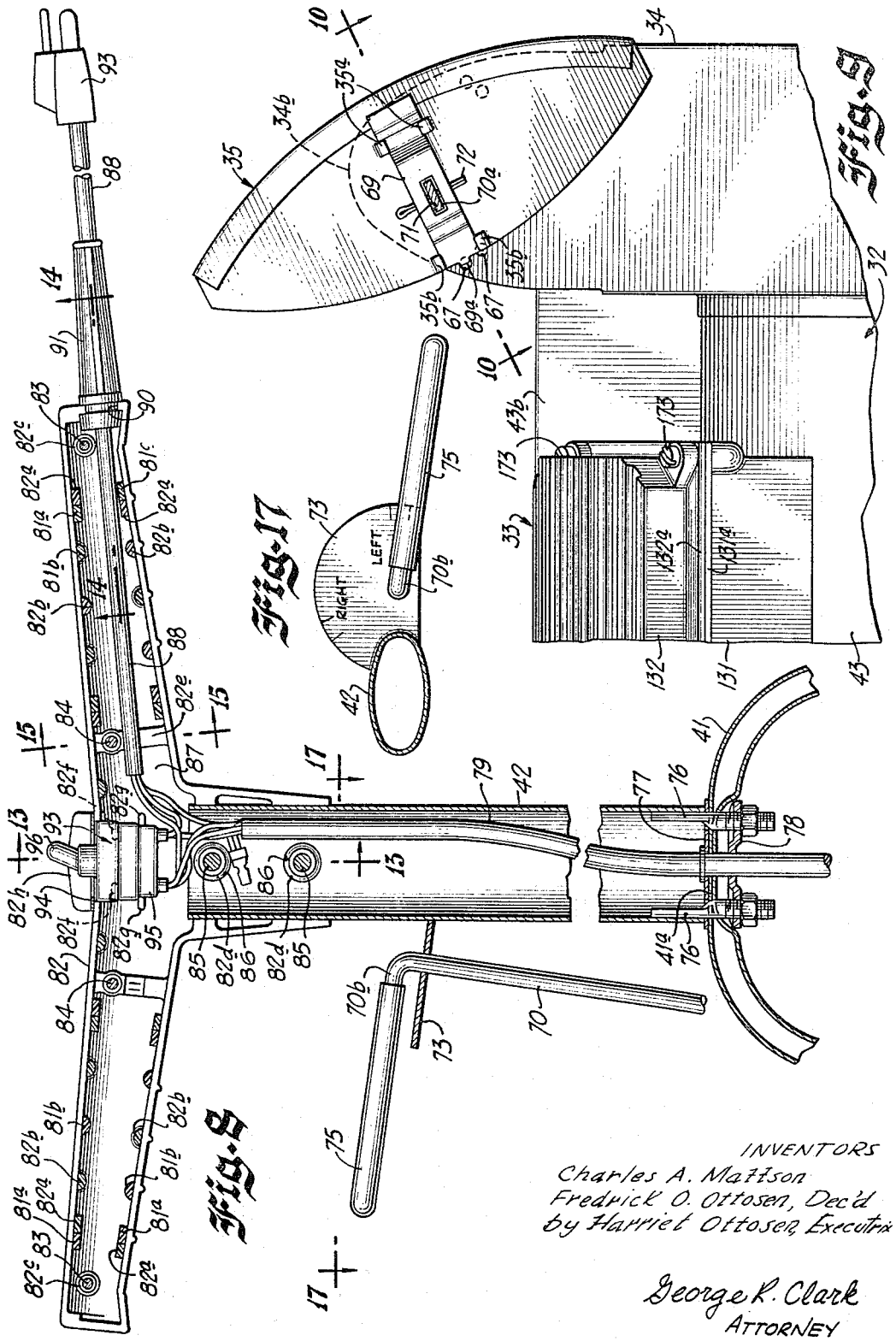

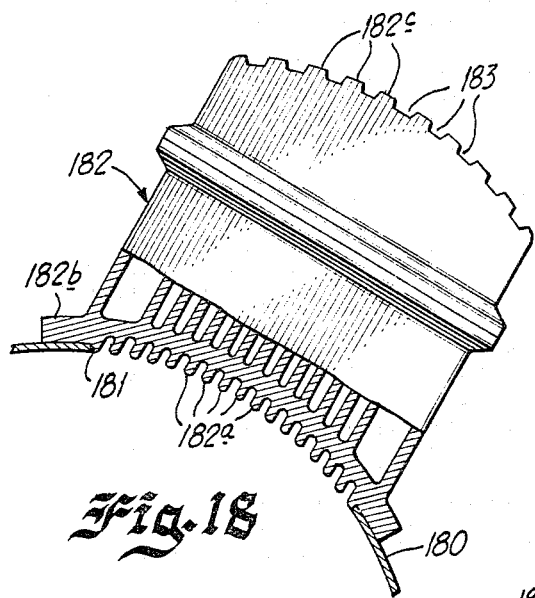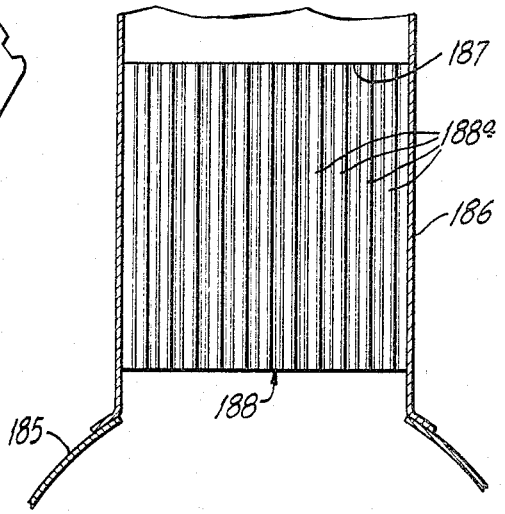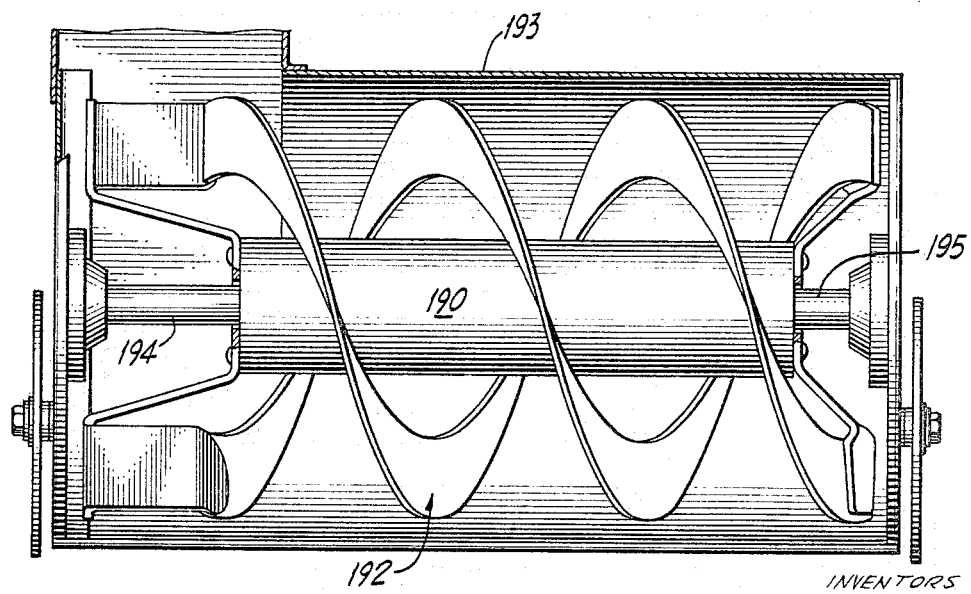

3,267,594
APPARATUS FOR REMOVING SNOW
Charles A. Mattson, Oak Park, Ill., Fredrick O. Ottosen, deceased, late of Chicago, Ill., by Harriet Ottosen, executrix, Chicago, Ill., assignors to Sunbeam Corporation, Chicago, Ill., a corporation of Illinois
Filed June 5, 1963, Ser. No. 286,142
21 Claims. (Cl. 37—43)

The present invention relates to apparatus for removing snow, and specifically to snow removal devices of the type generally referred to as snow throwers. More particularly, the present invention is directed to an electrically powered snow thrower.

Snow removal apparatus of the rotary type of a size useful for a householder to clean his walks and driveways has become very popular in recent years. This sort of apparatus, now commonly referred to as a snow thrower, generally utilizes an impeller mounted for rotation about a horizontal axis. Some of these snow throwers have the horizontal axis of the impeller disposed in the direction of travel of the snow thrower, and others have utilized the impeller mounted crosswise of the direction of travel. Heretofore all such devices have been powered by some form of internal combustion engine. This immediately poses a starting problem since these snow throwers must be available for use in all sorts of temperature, sometimes in excess of 30° F. below zero. Internal combustion engines have presented a starting problem even in summer, and of course the problem is multiplied many-fold when used on a snow thrower at very low temperatures. It would be desirable to provide a snow thrower powered by an electric motor whereby the operator is assured that the prime mover in the form of an electric motor is always ready to start upon the flick of a switch.

Electric powered lawn mowers have become very popular in recent years. It will be appreciated that the prime mover on a snow thrower will always be subjected to contact with snow and hence moisture, which means that if the prime mover is an electric motor the problem of substantial shock hazard exists. It is essential, therefore, in an electrically operated snow thrower to provide not only a completely sealed motor but a completely sealed electrical system. The conventional cooling means used with electric motors, namely, having a fan blow air through the motor housing, cannot be employed for this would permit moisture to enter the motor. Consequently, a cooling problem is presented requiring the cooling of an electric motor of relatively high power output, which, of necessity, must be completely sealed.

Accordingly, it is an object of the present invention to provide a new and improved apparatus for removing snow.

It is another object of the present invention to provide an electrically powered snow thrower in which a completely sealed motor is employed with improved cooling means for cooling such motor.

It is a further object of the present invention to provide an electrically powered snow removal apparatus in which a completely sealed electrical motor is employed to eliminate any shock hazard, and the motor is cooled by having the housing thereof in intimate heat exchange relationship either directly with the snow or with conducting means in direct heat exchange relationship with the snow being removed.

Still another object of the present invention resides in the provision of an electrically powered apparatus for removing snow wherein the electric motor, the electric control switch for controlling the motor and the electrical circuits are completely sealed against the entrance of moisture to eliminate the shock hazard which might otherwise occur.

Still another object of the present invention resides in an improved mounting arrangement in a snow thrower of an electric motor, an impeller means, and driving means between said motor and impeller means.

Further objects and advantages of the present invention will become apparent as the following description proceeds and the features of novelty which characterize the invention will be pointed out with particularity in the claims annexed to and forming a part of this specification.

For a better understanding of the present invention reference may be had to the accompanying drawings in which:

FIG. 1 is a perspective view of an electric snow thrower illustrating one embodiment of the present invention;

FIG. 2 is an enlarged front elevational view of the snow thrower of FIG. 1 with the upper handle portion partially cut away and with certain portions of the housing cut away more clearly to illustrate the present invention;

FIG. 3 is a somewhat fragmentary end view of FIG. 2 looking in the direction of the arrows 3—3 of FIG. 2, but with the wheel and end plate removed more clearly to illustrate the present invention;

FIG. 4 is an enlarged sectional view taken on line 4—4 of FIG. 2, assuming that FIG. 2 shows the complete structure;

FIG. 5 is an enlarged fragmentary sectional view taken on line 5—5 of FIG. 2, assuming that FIG. 2 shows the complete structure;

FIG. 6 is an enlarged fragmentary sectional view taken on line 6—6 of FIG. 3, also assuming that FIG. 3 shows the complete structure;

FIG. 7 is an enlarged fragmentary view taken substantially on line 7—7 of FIG. 3 to show a top plan view of the electric motor and drive means, with the upper motor housing section removed but with the sealing gasket in place;

FIG. 8 is an enlarged fragmentary sectional view of the upper handle portion taken substantially on line 8—8 of FIG. 1;

FIG. 9 is a fragmentary view of one side of the discharge chute taken substantially on line 9—9 of FIG. 3;

FIG. 10 is a fragmentary sectional view taken on line 10—10 of FIG. 9, assuming that FIG. 9 shows the complete structure;

FIG. 11 is an enlarged fragmentary sectional view taken on line 11—11 of FIG. 3;

FIG. 12 is a fragmentary sectional view taken on line 12—12 of FIG. 4, assuming that FIG. 4 shows the complete structure;

FIG. 13 is an enlarged fragmentary sectional view taken on line 13—13 of FIG. 8, assuming that FIG. 8 shows the complete structure;

FIG. 14 is an enlarged fragmentary sectional view taken on line 14—14 of FIG. 8, again assuming that FIG. 8 shows the complete structure;

FIG. 15 is an enlarged sectional view taken on line 15—15 of FIG. 8, again assuming that FIG. 8 shows the complete structure;

FIG. 16 is a fragmentary sectional view taken on line 16—16 of FIG. 6, assuming that FIG. 6 shows the complete structure;

FIG. 17 is a sectional view taken on line 17—17 of FIG. 8 but turned through an angle of 180° so the indicia thereon is right side up, also assuming that FIG. 8 shows the complete structure;

FIG. 18 is a fragmentary view partly in section somewhat similar to FIG. 5 illustrating another embodiment of the present invention;

FIG. 19 is a fragmentary view partly in section illustrating still another embodiment of the present invention; and FIG. 20 is a fragmentary view illustrating still another embodiment of the present invention.

Briefly, the present invention is concerned with apparatus for removing snow in which an impeller, auger, or worm is horizontally mounted for rotation within a housing open at the front so that when the housing is moved forwardly into snow to be removed, rotation of the impeller causes the snow to move toward one end of the housing and be thrown out of a suitable chute with deflector means which may be adjusted to various angles. The impeller is driven by an electric motor, which motor is completely sealed against the entrance of air or moisture. In order to cool this motor, the cold snow being removed is utilized. Various means are illustrated for accomplishing this. In one embodiment the motor is mounted in good heat exchange relationship with the impeller housing, the motor being provided with heat exchange fins, whereby the cold snow engaging the housing cools the motor. Additionally, the top of the housing is also provided with pockets to receive snow dropping thereon thereby accomplishing further cooling. In another proposed embodiment the motor is provided with a finned casing, the fins of which extend into the impeller chamber so as to directly contact the snow. In still another embodiment the motor is mounted near the discharge chute with cooling fins on the motor housing extending into the discharge chute so as to be in heat transfer relationship with snow discharged through the chute. In still another embodiment the motor is mounted within the impeller or auger so as to be entirely surrounded by the snow being moved by such impeller.

Additionally, in order to completely eliminate any shock hazard, all electrical connections, such as the electric control switch for the motor, are completely sealed in insulated rubber housings so that no moisture may reach any part of the electrical circuit including the motor, switch, or electrical conductors. The present invention also includes improved frame and mounting arrangements described in detail hereinafter.

Referring now to the drawings, there is illustrated and generally designated by the reference numeral 30 apparatus for removing snow embodying the present invention, commonly termed an electric snow thrower since, in accordance with the present invention, it is powered by an electric motor. Although not necessarily limited thereto, the present invention is primarily concerned with an arrangement especially designed for use by householders for removing snow from their sidewalks, driveways and the like. Such devices are generally designed to cover an area of the order of sixteen, eighteen, twenty or so inches in width. As best shown in FIG. 1 of the drawings, the electric snow thrower 30 of what is presently considered the preferred embodiment of the invention comprises an impeller, worm or auger generally designated at 31, mounted in a suitable housing generally designated at 32. The impeller, worm or auger 31 is driven at the desired speed by a suitable prime mover generally designated at 33 which, in accordance with the present invention, is a completely sealed electric motor, as will be described hereinafter. The housing 32 is provided at one end with a discharge chute 34 controlled by a pivotally mounted deflector member 35. The snow thrower 30 is supported on a pair of metal disk type wheels generally designated at 36 and 37, and a pair of rearwardly extending skids 38 and 39 (FIGS. 1, 3 and 4). For guiding and manipulating the electric snow thrower 30, there is included a handle comprising a lower handle portion 41 and an upper handle portion 42.

Considering first the details of the impeller housing 32, it comprises a sheet metal member 43 formed in the shape of a horizontally disposed cylinder, with the cylinder being discontinuous for a substantial angular portion thereof, thus defining at least the bottom edge 43a of the throat or opening at the front of an impeller chamber 44. In a device built in accordance with the present invention, the cylindrically formed sheet metal portion 32 covered an angular extent somewhat in excess of one hundred eighty degrees and had a diameter of approximately nine inches. So that the snow thrower 30 may satisfactorily be used in snow substantially deeper than the height of the throat or opening referred to above, the cylindrical housing portion 43 is preferably provided adjacent the top thereof with an upwardly extending projection 43b. To improve the appearance, the top of the projection 43b is provided a forwardly extending horizontal flange 43c, as best shown in FIGS. 1, 2 and 3 of the drawings.

In order to complete the housing 32, the open ends of the cylindrical member 43 with the upwardly projecting portion 43b is closed by a pair of end plates 45 and 46. In a device built in accordance with the present invention, the end plate 45 was formed of a sheet metal stamping, but the end plate 46 which defines a drive chamber 48 therein (FIGS. 3, 4 and 6) was formed as a suitable die casting. Obviously, the manufacturing details of these end plates could vary widely. The end plate 45 may be provided with a peripheral flange 45a, best shown in FIG. 4, which engages with the interior surface of the cylindrical housing member 43 and may be integrally united thereto by spot welding or the like. The end plate 46 defining therein a drive chamber 48 is preferably bolted or otherwise secured to the cylindrical housing 43. In a device built in accordance with the present invention, the fastening means employed were those best shown in FIGS. 3 and 11 of the drawings wherein the end plate 46 was provided with an outwardly directed peripheral flange 46a with integral projections defining spaced recesses 50 for snugly receiving in each recess a square-headed nut 51. Suitable screws 52 extending through the cylindrical housing 43 threadedly engage the nuts 51 and, hence, securely clamp the end plate 46 in position, as best shown in FIGS. 3 and 4 of the drawings. Thus, the impeller housing 32 defined by elements 43, 45 and 46 is provided with a relatively large rectangular opening or throat defined at the top by flange 43c, at the bottom by edge 43a, and at the sides by end plates 45 and 46.

As was mentioned above, the housing 32 is supported on wheels 36 and 37, which are very thin disks so that the snow thrower 30 will cut through the snow and will move along the ground or other surface on which the snow is disposed, with the bottom edge 43a of the throat of the housing 32 being close to the surface from which snow is to be removed. The disk wheels 36 and 37 are provided with suitable bearings and are supported by bolt type axles 54 extending through the respective end plates 45 and 46. It will be appreciated that the snow thrower may be used to remove snow from a smooth surface such as a sidewalk as well as from rough surfaces such as a driveway covered with crushed stone or similar material. In the latter case, it is desirable that the edge 43a of the throat be raised sufficiently so that stones or other material on the surface being cleaned of snow are not picked up by the snow thrower or unit 30. To this end adjustable axle supports are provided for the wheels 36 and 37. In FIG. 3 of the drawings the end plate 46 is illustrated as provided with a pair of spaced openings 55 and 56, the wheel axle 54 of the wheel 37 being indicated as disposed in the opening 56 whereby the housing 32 is in its lowermost position. Preferably the end plate 45 is provided with similar spaced openings. In order that the nuts on the axle bolt 54 do not interfere with the movement of snow in the impeller chamber 44, the end plate 46 is recessed as indicated at 58 in FIGS. 1 and 2, whereby the axle nut disposed therein is out of the way. In an embodiment built in accordance with the present invention, the axle bolt 54 for the wheel 36 extending through openings in plate 45 selectively engaged tapped openings in plate 60 (FIG. 4) welded or otherwise secured to the inside wall of end plate 45. The skids 38 and 39 project rearwardly from the housing 32, as best shown in FIGS. 1 and 3 of the drawings, and are secured to the housing by suitable fastening means 61. Preferably the skid 38 is fastened to the plate 45 by means of a plate similar to the plate 60 having tapped openings therein welded to the inside wall of the plate 45. The fastening means 61 for holding skid 39 preferably engages tapped openings in the end plate 46.

For the purpose of permitting snow to be discharged from the housing 32, the cylindrical portion 43 thereof is provided with a suitable opening 63 (FIGS. 2 and 4) at one end and adjacent the top thereof. The lower end of discharge chute 34 is so shaped that it may be suitably welded to the housing 32 and in effect become an integral part thereof. This discharge chute 34 terminates a short distance above the housing 32, but in order to provide support for pivoting the deflector 35, the discharge chute 34 includes forward and rear upwardly extending projections 34a and 34b, best shown in FIGS. 2, 3 and 9 of the drawings.

In order pivotally to support the deflector 35 to the upwardly projecting portions 34a and 34b of the chute 34, there are provided a pair of pivot pins 65 (FIGS. 1, 2, 3 and 10). The deflector plate 35 may be selectively moved about the axis of the pivot pins 65, and one position thereof is shown in the drawings. With this position snow is discharged for the maximum distance to the right of the snow thrower 30, as viewed from the front in FIG. 1. This deflector may, however, be pivoted in a clockwise direction as viewed in FIG. 1 to the opposite extreme, whereby snow is discharged to the left for the maximum distance as also viewed from the front in FIG. 1 of the drawings. So that the deflector 35 may remain in selected predetermined positions thereof, the projection 34b is provided with a plurality of latching or locking openings designated as 67, four of them being shown in FIG. 2 of the drawings. In accordance with the present invention, latching means are provided in the form of a spring member 69, best shown in FIGS. 3, 9 and 10 of the drawings. The spring member 69 is provided at one end with a lateral projection 69a defining a locking or latching pin selectively receivable in any one of the openings 67. For supporting spring member 69 in the position shown best in FIG. 10 of the drawings, a plurality of pairs of fingers 35a and 35b integral with deflector 35 are provided. The bracket 69 is so shaped and formed of a resilient spring material that when supported by the fingers 35a and 35b along an outside wall of deflector 35 the portion 69a is inherently biased in a direction to enter one of the openings 67 in chute extension 34b.

So that the operator utilizing the electric snow thrower 30 may manipulate the deflector 35 from the guiding end of upper handle portion 42, there is provided a deflector lever or rod 70 (FIGS. 1, 3, 8, 9, 10 and 17) mounted for both axial and pivotal movement. At the deflector end, rod 70 is provided with a flattened portion 70a receivable in a slot 71 in the spring member 69. A cotter key 72 or other suitable means prevents the rod 70 from being withdrawn from the slot 71. It will be appreciated that if a pulling force is applied to the rod 70 in the downward direction as viewed in FIG. 10 of the drawings, that the latching pin portion 69a will be removed from one of the openings 67 and thereafter a rotative force applied to the rod 70 will pivot the deflector 35 to any desired position. As best shown in FIGS. 1 and 17 of the drawings, the deflector rod 70 is of L-shaped configuration, and the lateral projection 70b at the upper end defines the manually engageable portion. For supporting the upper end of rod 70 to permit pivotal movement thereof, there is preferably welded or otherwise secured to the upper handle portion 42 a support member 73 which may have suitable indicia applied thereto, as indicated in FIG. 17 of the drawings, showing the position of deflector 35 with specific positions of projection 70b. As illustrated, a hand grip sleeve portion 75 is applied to the portion 70b of the handle 70 for ease of manipulation thereof.

As is fully disclosed in FIGS. 1, 2 and 8 of the drawings, the handle for the snow thrower 30 comprises the previously mentioned lower U-shaped handle portion 41 and the tubular upper handle portion 42 which is illustrated as having a somewhat oval cross section, as best shown in FIG. 17 of the drawings. These handle portions are interconnected at the bight portion of the U-shaped member 41, which is flattened as indicated at 41a in FIG. 8 of the drawings. As there also illustrated, a pair of bolts 76 welded to the inside of the tubular handle portion extend through openings in flattened portion 41a. Preferably a U-shaped upper clamping member 77 and a lower clamping plate 78 are employed securely to relate the upper handle member 42 and the lower handle member 41. Suitable aligned openings are also provided in portion 41a and elements 77 and 78 to permit a power cord 79 to pass therethrough, which cord is preferably disposed within the upper hollow handle portion 42. To secure the handle to the housing 32, the lower ends of the U-shaped handle portion 41 remote from the bight portion are flattened as indicated at 41b and are suitably secured to the housing 32 by fastening means 80. Preferably the end plates 45 and 46 of the housing 32 are provided with handle engaging projections, such as 45b and 45c (FIG. 1) in the case of end plate 45, and similar projections in the case of end plate 46, which engage the upper and lower edges, respectively, of the flattened portions 41b of lower handle portion 45. Consequently, the operator, by lifting up or pressing down on the upper end of the handle, may readily manipulate the snow thrower 30.

For the purpose of providing handle grip portions at the upper end of the tubular handle portion 42, there are provided a pair of molded complementary T-shaped plastic members 81 and 82 which are suitably secured together to define a hollow hand grip and switch housing member 81–82 (FIGS. 1, 8, 13, 14 and 15). Preferably the members 81 and 82 are identical. As illustrated, the complementary members 81 and 82 are secured together by a plurality of pairs of bolts or fastening means 83, 84 and 85. To insure that these fastening means hold members 81 and 82 in assembled relationship, abutting or interlocking post portions integral with members 81 and 82 surround the openings for these fastening means. Also, each member 81 and 82 is provided adjacent their abutting edges with integral interlocking fingers 81a, 81b and 82a, 82b. Representative of the interlocking post portions are posts 81c and 82c, best shown in FIG. 14 of the drawings. Representative of the abutting post portions are pairs of posts 81d and 82d, best shown in FIG. 13 of the drawings. These posts 81d and 82d are utilized rigidly to relate the hand grip members 81 and 82 to the upper end of tubular upper handle member 42. As best shown in FIG. 13, posts 81d and 82d are tapered from the base thereof toward the abutting portions, and they are adapted to extend through suitable aligned openings 86 in tubular handle portion 42. As the fastening means 85 are applied, they will clamp elements 81 and 82 to element 42 and rigidly interrelate these parts in a handle assembly.

The chamber generally designated as 87 defined within the handle grip 81–82 provides a convenient space for a power cord 88 which enters a suitable opening 90 (FIG. 8) in the end of one hand grip portion. Preferably, a strain relief 91 surrounds power cord 88 and is clamped in opening 90. Preferably also, the power cord 88 is clamped between projections 81e and 82e (FIGS. 8 and 15) of hand grip portions.

In order to control the electrical circuit between power cords 79 and 88, there is provided a suitable toggle switch 93 (FIGS. 8 and 13) suitably supported within chamber 87. As best shown in FIG. 13 of the drawings, each of the hand grip members 81 and 82 is provided with integral projecting finger and shelf portions designated as 81f and 81g in the case of hand grip portion 81, 82f and 82g in the case of hand grip portion 82. The toggle switch 93 is adapted to be securely positioned in chamber 87 by the finger and shelf portions just described, and when the members 81 and 82 are clamped together switch 93 is firmly supported with the knob 93a of the switch projecting beyond the handle through a suitable opening defined therein, as clearly shown in FIG. 8 of the drawings. This opening is preferably closed by a suitable switch plate 94 having indicia "ON" and "OFF" thereon to indicate the condition of toggle switch 93 by the position of knob 93a. To prevent accidental actuation of the switch knob 93a, the hand grip portions 81 and 82 are preferably provided with projections 81h and 82h defining a switch guard.

To insure that the electrical circuit is completely sealed against the entrance of moisture, the switch 93 including the manually actuatable switch knob 93a is completely enclosed in a resilient flexible rubber housing. As best shown in FIG. 13 of the drawings, a two-part housing comprising a lower flexible enclosure 95 and an upper flexible enclosure 96 are provided, formed of a thin flexible rubber so that the operator may actuate the switch lever 93a completely enclosed in an insulating housing. The finger portions 81f and 82f also tend to clamp the flexible housing members 95 and 96 in the position shown in FIG. 13 of the drawings. It will be understood that the switch 93 is connected in one line of the power cords 79 and 88.

Considering now the impeller or auger 31, it comprises a horizontally disposed shaft 98 suitably journalled for rotation in impeller chamber 44 in bearings described hereinafter mounted in the end plates 45 and 46. Supported from the shaft 98 by end brackets 99 and 100 and center bracket 101 are a pair of spiral members 102 and 103 which when supported on the shaft define a double helix impeller or auger which chops up the snow and tends to move it toward the end of housing 32 provided with the discharge opening 63 and discharge chute 34. The end bracket 99 disposed adjacent the discharge chute 34 is provided with a pair of axial extensions 99a and 99b secured to the helix members 102 and 103. These extensions 99a and 99b engage the snow as it reaches the chute end of impeller chamber 44 and tend to throw this snow outwardly at high speed so as to be discharged through the chute 34. The brackets 99, 100 and 101 are preferably welded or otherwise secured to the impeller shaft 98 and also to the spiral or helically shaped members 102 and 103 to provide a unitary impeller structure 31.

As best shown in FIG. 4 of the drawings, the end plate 45 is provided with a dished-in portion 45d for receiving a suitable bearing 105 which is held in position by a bearing retainer 106 suitably secured as by rivets 107 to the end plate 45. For lubrication purposes an oil wick 108 is preferably clamped in position around the outside bearing 105, suitable means being provided to feed oil from this wick to the bearing. The other end of impeller shaft 98 is suitably journalled in a bearing 110 (FIGS. 4 and 12) having a hexagonal extension 110a on one end thereof and a hexagonal extension 110b on the other end thereof. As is best shown in FIG. 12 of the drawings, the shaft opening for shaft 98 in bearing 110 is eccentrically disposed with respect to the bearing itself so that rotation of the bearing in its seat will cause limited radial movement of the end of impeller shaft 98 adjacent the end plate 46. The reason for this is that the drive means described hereinafter includes a flexible chain and the chain may be tightened by displacement of the end of impeller shaft 98 through pivotal movement of bearing 110 relative to the end plate 46.

To accommodate bearing 110, end plate 46 is provided with a spherical recess and bearing 110 is held in this recess by a suitable bearing retainer 112 clamped to the end plate by suitable fastening means 113, best shown in FIGS. 2 and 12 of the drawings. By applying a suitable wrench to the hexagonal portion 110a of bearing 110 projecting into the impeller housing 44, the limited adjustment of the end of shaft 98 relative to end plate 46 may be accomplished. So that any desired adjustment will remain fixed, there is provided a latching collar 114 having a hexagonal central opening which just receives the hexagonal portion 110b of bearing 110. The collar 114 is provided with a plurality of notches 115 around its periphery for engagement by a set screw 117 threadedly engaging an opening in end plate 46.

As is best shown in FIG. 3 of the drawings, the end plate 46 includes a portion projecting above the cylindrical housing portion 43 which permits the drive chamber 48 to extend above the impeller housing 32. Drive chamber 48 houses suitable drive means, generally designated as 119 (FIG. 3), drivingly interrelating the prime mover 33 and impeller shaft 98. This drive means includes a suitable sprocket 120 keyed to the impeller shaft 98 within the chamber 48 and held in position by virtue of a suitable clamping nut 121 engaging a threaded end of the impeller shaft 98. The drive means 119 also includes a jack shaft 122 which extends through an opening 123 in one wall of chamber 48 so as to make driving connection with the prime mover 33, as best shown in FIGS. 6 and 7 of the drawings. The jack shaft 122 is preferably journalled in a flanged bearing 124, the enlarged flange 124a of which is suitably and snugly supported in the opening 123. The portion of reduced cross section 124b of flanged bearing 124 is suitably and snugly supported in an opening defined in the housing of the prime mover 33, as described in detail hereinafter. Secured to the end of jack shaft 122 within the drive chamber 48 is a sprocket 125 which, as indicated in FIG. 6, is pinned to the jack shaft 122 by pin 126. A sprocket chain 127 is indicated as drivingly interconnecting the sprockets 120 and 125. It should be understood that the illustrated drive means, generally designated by the reference numeral 119 in FIG. 3 of the drawings and comprising the sprockets 120 and 125 and the sprocket chain 127, has been found to be very satisfactory but obviously other drive means may be employed. It will be appreciated from the above description that the adjustable bearing 110 provides a simple means for adjusting the tightness of sprocket chain 127.

Since the prime mover of the present invention is an electric motor which tends to be a relatively high speed device, the drive means 119 must of necessity reduce the speed of rotation between that of the prime mover and that of the impeller 32. In a device built in accordance with the present invention, the impeller 32, at no load, rotated at a speed of the order of 1900 r.p.m. In this same device the sprockets 120 and 125 and chain 127 provided a three-to-one speed reduction. The drive chamber 48 is preferably filled or supplied with a desired lubricant, and then the chamber is closed by a suitable cover 128 secured thereto by a suitable fastening means 129 and 130. To insure that the center portion of the cover 128 will not be displaced against the sprocket chain 127, the end plate 46 is preferably provided with a hollow projection 46b for receiving the fastening means 130, best shown in FIG. 6 of the drawings.

In order to rotate the jack shaft 122, there is provided in accordance with the present invention the prime mover 33 which comprises an electric motor completely sealed against the entrance of moisture or air. The prime mover or electric motor 33 is mounted in a two-part metal housing comprising a lower cup-shaped housing portion 131 and an upper cup-shaped housing portion 132, best shown in FIGS. 1, 5, 6 and 7 of the drawings. These housing portions 131 and 132 are provided with peripheral flanges 131a and 132a, respectively, around the open sides thereof so they may be clamped together with the flanges abutting each other. With such a completely sealed housing for prime mover 33 a cooling problem is presented. In accordance with the present invention, this is solved by constructing the bottom or lower housing section 131 with a concave exterior configuration so as to snugly engage in good heat exchange relationship the exterior of the cylindrical housing portion 43, as best shown in FIG. 5 of the drawings. Moreover, the inside of this exteriorly concave wall of the lower housing section 131 is provided with a plurality of inwardly directed fins or projections, designated as 131b, which provide cooling fins for absorbing heat developed in the motor housing and rapidly transmitting it to the concave wall portion and then to the housing 43, which latter, of course, is constantly engaged and hence cooled by the snow passing through impeller chamber 44. To secure the lower housing section 131 in good heat exchange relationship with impeller housing 32, it is bolted or clamped to the latter by fastening means 133, best shown in FIGS. 2 and 6 of the drawings. So that these fastening means 133 will not interfere with the movement of the snow along the interior of the impeller chamber 44, preferably the cylindrical housing portion 43 is provided with suitable recesses 134 of a size to accommodate the fastening means 133.

The upper housing section 132 is similarly provided on the inside of the top wall thereof, as best shown in FIG. 5 of the drawings, with a plurality of fins 132b which serve the same purpose. Moreover, the exterior of the housing is provided with a plurality of projecting longitudinal ribs 132c defining a plurality of grooves 135 therebetween. This construction is for the purpose of catching and retaining particles of snow which are exhausted through chute 34 and which, of course, will have a very good cooling effect on the upper housing section 132 and will cause rapid dissipation of heat from the interior of the motor housing supplied to the fins 132b.

As illustrated in the drawings, the lower and upper housing sections 131 and 132, respectively, are mating sections of generally rectangular configuration. As best shown in FIG. 6 of the drawings, the lower housing section is provided with an integral partition 131c adjacent one end separating the housing section into a motor chamber 136a and a gear chamber 136b. The upper housing portion 132 is similarly provided with a depending projection 132d. The projections 131c and 132d are provided with cooperating semicircular recesses for receiving therein an armature roller bearing assembly 137 (FIGS. 6, 7 and 16), the purpose of which will become apparent from the ensuing description. To aid in retaining this bearing assembly 137 in the semicircular recess in the top of partition 131c, this recess is preferably in the form of a shallow channel, as best shown in FIG. 6 of the drawings. To hold ball bearing assembly 137 in this recess, a suitable bearing retainer 138 is secured to the partition 131c by fastening means 139. The bearing retainer is preferably provided with a slot 140 which is disposed directly between a wick 141 suitably secured in a recess defined in the partition 132d to insure the desired lubrication for the ball bearing unit or assembly 137. The partition 131c is also provided with an opening 142 for receiving a bearing 143 for the end 122a of jack shaft 122 which is illustrated as of reduced cross section. Also for the purpose of receiving the portion 124b of flanged bearing 124, the lower motor housing 131 is provided with an end opening 145 which snugly engages the exterior of portion 124b of flanged bearing 124. The jack shaft 122 is provided in gear chamber 136b with a gear 146 suitably keyed to the shaft as indicated at 147.

Mounted within the sealed housing or casing comprising the housing sections 131 and 132 and comprising the prime mover 33 is an electric motor generally designated at 150 as comprising a two-pole laminated stator 151 including field windings 152 wound to energize the diametrically opposed pole faces 151a and 151b (FIG. 5) and an armature 153 suitably supported on an armature shaft 154 for rotation in close proximity with the pole faces 151a and 151b of stator 151. To support the field structure of motor 150 in the sealed housing of the present invention, the stator laminations are each provided with lateral extensions to define lugs 151c and 151d (FIGS. 5 and 7) which are adapted to engage with the upper ends of a plurality of fingers 131d formed integrally with housing section 131 and extending upwardly therein in a manner similar to fins 131b. Obviously, the fingers 131d also function as cooling fins. To further accurately position stator 151 in housing section 131 with the lugs 151c and 151d supported on the fingers 131d, the lower surface of the stator is notched as indicated at 155 to receive a center fin 131e (FIG. 5), thereby accurately to position stator 151 as far as lateral movement is concerned. Movement in the axial direction is also prevented by other fins.

For supporting the armature 153 of motor 150, there is provided in the end of motor chamber 136a remote from gear chamber 136b a bearing 156 supported in a spherical recess defined in the top of an upwardly extending bearing support 131f formed integrally with casing section 131. A combined brush and bearing retainer 157 of somewhat U-shaped configuration, best shown in FIG. 7 of the drawings, clamped to support 131f by fastening means 158 holds the bearing 156 in position on support 131f. Preferably support 131f is provided with a recess for receiving an oil wick 159 to insure the desired lubrication of this bearing 156. The other end of the motor shaft 154 is supported in the armature ball bearing unit or assembly 137 previously described with the end of the armature shaft projecting into the gear chamber 136b. As best shown in FIGS. 6 and 7 of the drawings, this end of armature shaft 154 is provided with gear teeth defining a helical gear 160 for drivingly engaging the gear 146. The gears 146 and 160 are designed to provide a substantial speed reduction whereby the jack shaft 122 rotates at a substantially lower speed than motor shaft 154. In a device built in accordance with the present invention, a speed reduction in excess of four to one was obtained by gears 146 and 160.

Mounted on the motor shaft 154 is a conventional commutator 161 engaged by conventional brushes 162 disposed in molded hollow insulating rectangular brush retainers 163. A suitable compression spring 164 interposed between the inside of the closed end of the brush retainer 163 and the end of the associated brush housed therein biases each brush 162 into engagement with the commutator 161. Preferably the brush retainers 163 are provided with slots 165 through which electrical connection can be made with the motor winding 152 and the brushes 162. The brush retainers 163 are positioned by suitable supports 131g and 131h (FIG. 7) integrally formed with housing section 131. The combined bearing and brush retainer 157 effectively clamps the brush retainers 163 to supports 131g and 131h. In order to circulate air within the sealed motor chamber 136a between the cooling fins described above, there is provided a fan 167 secured to the shaft 154, causing substantial air circulation around all the fins such as 131b, 132b, etc. To hold the stator in the position shown in FIG. 5 of the drawings when the housing sections 131 and 132 are secured together, there is provided a cushioning member 169 which is clamped between the top of the field structure 151 and the inside of the upper housing section 132. As best shown in FIG. 5 of the drawings, preferably two of the fins designated as 132f are shortened to accommodate the member 169 between the fins 132b on either side of fins 132f.

For the purpose of providing an air and watertight seal between the upper and lower housing sections 131 and 132, one or both of the flanges 132a and 132b are provided with a recess for receiving a suitable sealing or "O" ring 172. This recess is specifically disclosed as being in the flange 132a of the upper housing section 132, but it obviously could be in either housing section or in both. The two housing sections are clamped together in sealed relationship by suitable clamping means in the form of bolts 173, best shown in FIGS. 1, 2, 6, 7 and 9 of the drawings, to distort the "O" ring 172 to the form shown in the drawings, thereby to provide a completely sealed housing.

In view of the detailed description included above, the operation of the snow thrower 30 of the present invention will readily be understood by those skilled in the art. A completely sealed motor, switch and electrical system is provided so that no air or moisture can come in contact with these electrical parts and, consequently, any shock hazard is completely eliminated. When the operator desires to use the snow thrower 30 of the present invention, he merely turns on the switch 93 and immediately the impeller 31 is driven at the desired speed, and if the throat of the snow blower is moved so that snow enters the same the impeller causes this snow to be exhausted through the discharge chute in any desired direction depending upon the setting of the deflector 35. The snow being thrown by centrifugal force into contact with the inside of housing 32 will, of course, cool this housing which is in good heat exchange relationship with the motor housing section 131 and with the finned arrangement disclosed provides the desired cooling of the motor. Additionally, snow is dropped into and retained by the grooves 135 for additional cooling.

In the arrangement described above, the completely sealed motor housing or casing 131–132 is in good heat transfer relationship with the impeller housing 32. In FIG. 18 of the drawings there is illustrated a modification of the present invention in which an impeller housing, very similar to the housing 32, is designated by the reference numeral 180. The parts of the snow thrower not shown in FIG. 18 are preferably identical with those previously described. The housing 180 is provided with an opening 181 exposing fins 182a of a completely sealed power unit 182 to the snow moved by the impeller and thrown thereby against such fins. Preferably the motor housing 182 is provided with an integral flanged portion 182b which is secured in any suitable manner to the impeller housing 180. The top of the sealed housing 182 is provided with ribs 182c defining grooves 183 therebetween which serve the identical purpose that is served by the grooves 135 previously described. The fins 182a are illustrated as extending in the direction of the longitudinal axis of the impeller chamber 180 but might have some other form so long as they are in direct heat transfer relationship with the snow moved along the impeller chamber in the same manner as described in the previous embodiment. The fins 182a provide therebetween recesses or pockets for receiving and retaining snow and other constructions which will accomplish this may be employed.

Instead of having means such as fins or the like in heat transfer relationship with snow in the impeller chamber, there is illustrated in FIG. 19 of the drawings an arrangement in which the fins projecting from the motor housing are disposed so as to be contacted by snow discharged through the discharge chute. In FIG. 19 of the drawings the impeller chamber is designated as 185 and the discharge chute is designated as 186. This discharge chute is provided in one wall thereof with an opening 187 to permit the completely sealed housing 188 of the prime mover to be exposed to the snow exhausted through the discharge chute. This prime mover is indicated as being provided with projecting fins 188a so as to engage the snow being discharged and thus provide a very desirable means for dissipating rapidly the heat produced by an electric motor disposed in a completely sealed housing. Any other arrangement providing pockets or recesses for retaining snow passing through the discharge chute for cooling the electric motor may be employed.

In FIG. 20 of the drawings there is illustrated another embodiment of the present invention in which an electric motor mounted in a completely sealed housing generally designated at 190 is disposed along the axis of an impeller, generally indicated at 192, mounted within an impeller housing 193. The sealed housing 190 which is rotatable may be mounted on stationary shaft members 194 and 195 suitably supported by end plates of impeller housing 193. One or both of these shafts may be hollow, through which electrical connections to the motor contained within the sealed housing 190 may be made. It will be appreciated that the electric motor contained in sealed housing 190 may be one in which the housing is effectively the rotating stator and the armature is effectively stationary. In any event, the housing thereof will be in good heat transfer relationship with the snow being removed and will provide the necessary cooling for the sealed chamber. It will, of course, be appreciated that a suitable mechanism for producing the desired speed of impeller 192 will be incorporated in the housing 190.

While there have been shown and described several embodiments of the present invention, it will be apparent to those skilled in the art that numerous changes and modifications may occur, and it is intended in the appended claims to cover all such changes and modifications which fall within the true spirit and scope of the present invention.

What is claimed as new and desired to be secured by Letters Patent of the United States is:

1. Apparatus for removing snow comprising an elongated cylindrical impeller housing open along one side and closed at both ends, means for supporting said housing with the longitudinal axis thereof disposed in a generally horizontal position for movement in a direction transverse to said longitudinal axis, a rotatable impeller mounted in said impeller housing including a first impeller portion for moving snow within said impeller housing in the direction of said longitudinal axis and in good heat exchange relationship with at least a portion of said impeller housing and a second impeller portion for throwing snow engaging said second impeller portion outwardly at high speed, an electric motor including an elongated casing, said casing completely sealing said motor against the entrance and exit of fluids, means for mounting said casing with its longitudinal axis parallel with the axis of said impeller housing and with a substantial area of said casing in good heat exchange relationship with said portion of said impeller housing whereby the moving snow in said impeller housing cools said portion of said impeller housing and said motor, and drive means interconnecting said electric motor and said impeller.

2. The apparatus of claim 1 wherein a discharge chute is provided for said impeller housing, and said casing includes a portion thereof exposed to snow moving through said discharge chute so as to be cooled by such snow.

3. The apparatus of claim 1 wherein said casing partly defines said impeller housing.

4. Apparatus for removing snow comprising housing means defining an elongated cylindrical impeller chamber open along one side, a discharge chute connected to said housing means, a first mechanism for supporting said housing means for movement with the longitudinal axis of said chamber disposed in a generally horizontal position and such movement being generally transverse to said longitudinal axis, an electric motor, casing means enclosing said motor and completely sealing said motor against the entrance and exit of fluids, a second mechanism for fixedly supporting at least a portion of said motor relative to said housing means, a rotatable impeller mounted in said chamber including a first impeller portion for moving snow in said chamber in the direction of the longitudinal axis thereof and in direct heat exchange relationship with one of said means and a second impeller portion for throwing the snow engaging said second impeller portion outwardly at high speed into said discharge chute, said electric motor being in good heat exchange relationship with at least the one of said means in direct heat exchange relationship with said moving snow, and drive means drivingly interconnecting said electric motor and said impeller.

5. The apparatus of claim 4 wherein said casing means includes a substantial area thereof in good heat transfer relationship with a substantial area of said housing means.

6. The apparatus of claim 4 wherein said housing means is provided with an opening, and said casing means includes a portion disposed in said opening so as to be directly exposed to snow moved by said impeller whereby said casing means is cooled by direct contact with snow moving in said impeller chamber.

7. The apparatus of claim 4 wherein said casing means directly defines a portion of said cylindrical impeller chamber.

8. The apparatus of claim 4 wherein said casing means is disposed within said impeller.

9. The apparatus of claim 4 wherein said casing means is disposed entirely within said housing means.

10. The snow removing device of claim 4 wherein said casing means defines a portion of said housing means.

11. The snow removing device of claim 4 wherein said casing means is in good heat transfer relationship with said housing means.

12. The snow removing device of claim 4 wherein said casing means includes grooves for retaining snow moved by said impeller.

13. Apparatus for removing snow comprising an impeller housing including a portion of cylindrical configuration, a rotatable impeller mounted in said impeller housing, an electric motor, a sealed casing enclosing said electric motor and preventing cooling fluid from entering or exiting from said casing, said casing including a portion defining a concave exterior, the diameter of said concave exterior corresponding with the exterior diameter of said cylindrical portion, means for securing said casing to said housing with said portion defining a concave exterior in good heat transfer relationship with said portion of cylindrical configuration, drive means drivingly relating said electric motor and said impeller whereby upon energization of said electric motor snow is thrown by centrifugal force against the interior of said housing, and means within said casing for causing heat developed by said electric motor to be transmitted to said casing including said concave exterior whereby snow removed by said apparatus cools said motor.

14. The apparatus of claim 13 wherein said casing also includes grooves on the upper portion thereof for catching snow removed by said apparatus further to cool said casing.

15. The apparatus of claim 13 wherein said last-mentioned means comprises a plurality of inwardly directed fins within said casing and means for causing a circulation of air within said casing around said fins.

16. The apparatus of claim 13 wherein an opening is defined in said cylindrical portion to expose said concave portion to the interior of said impeller housing whereby snow thrown by said impeller will engage at least a portion of said concave exterior.

17. The apparatus of claim 13 wherein said means within said casing comprise a plurality of fins inside said casing and formed integrally therewith.

18. Apparatus for removing snow comprising an impeller housing defined by a cylindrical portion and a pair of end plates closing the ends of said cylindrical portion, said cylindrical portion and end plates defining a first opening for receiving snow, a second opening for discharging snow and a third opening, means for supporting said housing with the longitudinal axis thereof disposed in a generally horizontal position for movement in a direction transverse to said longitudinal axis and transverse to said first opening, a rotatable impeller mounted in said impeller housing including a first impeller portion for moving snow within said impeller housing in the direction of said longitudinal axis and a second impeller portion for throwing snow engaging said second impeller portion outwardly at high speed through said second opening, an electric motor, a casing enclosing said motor and completely sealing said motor against the entrance and exit of fluids, means for supporting said electric motor on said impeller housing with said casing disposed over said third opening, drive means drivingly interconnecting said electric motor and said impeller, and heat transfer means between said casing and motor.

19. The apparatus of claim 18 wherein said heat transfer means is within said casing for rapidly transferring heat produced by said motor to said casing.

20. The apparatus of claim 18 wherein said impeller housing includes a discharge chute overlying said second opening for guiding snow discharged through said second opening and wherein said third opening is in said discharge chute whereby the snow passing through said chute is utilized for cooling said casing and hence said motor.

21. A snow removal device comprising housing means defining an elongated cylindrical impeller chamber open along one side, a discharge chute connected to said housing means, a first mechanism for supporting said housing means for movement with the longitudinal axis of said chamber disposed in a generally horizontal direction and such movement being generally transverse to said longitudinal axis, an electric motor, elongated casing means enclosing said motor and completely sealing said motor against the entrance and exit of fluids, a second mechanism for mounting said motor with the longitudinal axis of said casing means generally parallel with the longitudinal axis of said housing means, a rotatable impeller mounted in said chamber including a first impeller portion for moving snow in said chamber in the direction of the longitudinal axis thereof and in direct heat exchange relationship with one of said means and a second impeller portion for throwing the snow engaging said second impeller portion outwardly at high speed into said discharge chute, said electric motor being in good heat exchange relationship with at least the one of said means in direct heat exchange relationship with said moving snow, and drive mechanism drivingly interconnecting said electric motor and said impeller.

References Cited by the Examiner

UNITED STATES PATENTS

| | | | |
|---|---|---|---|
| 1,883,288 | 10/1932 | Zubaty. | |
| 2,000,874 | 5/1935 | Babb | 103—87 |
| 2,075,581 | 3/1937 | Jeswine | 37—43 |
| 2,372,172 | 3/1945 | Bevan | 37—43 |
| 2,424,317 | 7/1947 | Jones | 310—52 |
| 2,440,943 | 5/1948 | Gonsett. | |
| 2,508,829 | 5/1950 | Lamy. | |
| 2,516,184 | 7/1950 | Christie. | |
| 2,566,724 | 9/1951 | Heil. | |
| 2,632,263 | 3/1953 | Cooper. | |
| 2,646,690 | 7/1953 | Crowther | 74—242.16 |
| 2,691,307 | 10/1954 | Pillsbury | 74—242.16 |
| 2,694,157 | 11/1954 | Cone | 310—58 |
| 2,695,071 | 11/1954 | Hupp. | |
| 2,735,027 | 2/1956 | Formhals | 310—58 |
| 2,768,453 | 10/1956 | Adams | 37—43 |
| 2,769,255 | 11/1956 | Mead | 37—43 |
| 2,770,893 | 11/1956 | Jacobs | 37—43 |

(Other references on following page)

UNITED STATES PATENTS

| | | | |
|---|---|---|---|
| 2,889,641 | 6/1959 | Rechenberg | 37—43 |
| 3,028,719 | 4/1962 | Jepson. | |
| 3,066,428 | 12/1962 | Raiti | 37—12 |
| 3,074,189 | 1/1963 | Phelps. | |
| 3,078,603 | 2/1963 | Ertsgaard | 37—43 |
| 3,142,913 | 8/1964 | Jacob | 37—43 |

FOREIGN PATENTS

| | | |
|---|---|---|
| 218,348 | 6/1924 | Great Britain. |
| 181,981 | 6/1936 | Switzerland. |

ANTONIO F. GUIDA, *Acting Primary Examiner.*

BENJAMIN HERSH, *Examiner.*

W. B. STONE, F. B. HENRY, *Assistant Examiners.*